(12) United States Patent
Ohno et al.

(10) Patent No.: US 7,250,385 B1
(45) Date of Patent: Jul. 31, 2007

(54) CATALYST AND METHOD FOR PREPARATION THEREOF

(75) Inventors: Kazushige Ohno, Gifu (JP); Noriyuki Taoka, Gifu (JP); Teruo Komori, Gifu (JP); Akira Hasegawa, Aomori (JP); Noriyoshi Kakuta, Aichi (JP)

(73) Assignee: Ibiden Co., Ltd., Gifu (JP)

( * ) Notice: Subject to any disclaimer, the term of this patent is extended or adjusted under 35 U.S.C. 154(b) by 0 days.

(21) Appl. No.: 10/129,126

(22) PCT Filed: Nov. 16, 2000

(86) PCT No.: PCT/JP00/08086

§ 371 (c)(1),
(2), (4) Date: Jul. 12, 2002

(87) PCT Pub. No.: WO01/36097

PCT Pub. Date: May 25, 2001

(30) Foreign Application Priority Data

Nov. 16, 1999 (JP) ............................ 11-325369
Feb. 29, 2000 (JP) ............................ 2000-55063
Jun. 30, 2000 (JP) ............................ 2000-198199

(51) Int. Cl.
*B01J 23/10* (2006.01)

(52) U.S. Cl. ............ 502/178; 502/200; 502/263

(58) Field of Classification Search ............ 502/355, 502/439, 178, 179, 263, 200, 302
See application file for complete search history.

(56) References Cited

U.S. PATENT DOCUMENTS

| | | | |
|---|---|---|---|
| 3,410,651 A | 11/1968 | Brandenburg et al. | |
| 3,554,929 A | 1/1971 | Aarons | |
| 3,656,830 A | 4/1972 | Kurschner | |
| 3,767,453 A | 10/1973 | Hoekstra | |
| 4,102,819 A * | 7/1978 | Petrow et al. | 502/262 |
| 4,273,188 A | 6/1981 | Vogel et al. | |
| 4,399,185 A * | 8/1983 | Petrow | 422/121 |
| 4,419,108 A | 12/1983 | Frost et al. | |
| 4,438,219 A | 3/1984 | Brandenburg et al. | |
| 4,483,940 A | 11/1984 | Ono et al. | 502/159 |
| 4,528,279 A | 7/1985 | Suzuki et al. | |
| 4,572,904 A | 2/1986 | Onal | 502/333 |
| 4,702,897 A | 10/1987 | Onal | 423/213.5 |
| 4,749,671 A | 6/1988 | Saito et al. | |
| 4,919,902 A | 4/1990 | Bricker et al. | 423/213.5 |
| 4,940,684 A | 7/1990 | Okutani et al. | |
| 4,959,338 A | 9/1990 | Miura et al. | |
| 5,139,760 A | 8/1992 | Ogawa et al. | |
| 5,171,341 A | 12/1992 | Merry | |
| 5,346,722 A | 9/1994 | Beauseigneur et al. | 427/300 |
| 5,453,260 A | 9/1995 | Nakazawa et al. | |
| 5,545,243 A | 8/1996 | Kotani et al. | |
| 5,776,419 A * | 7/1998 | Ihara et al. | 422/177 |
| 5,830,415 A | 11/1998 | Maeda et al. | |
| 5,853,444 A | 12/1998 | Maier et al. | |
| 5,914,187 A | 6/1999 | Naruse et al. | |
| 6,017,473 A | 1/2000 | Maier et al. | |
| 6,669,751 B1 | 12/2003 | Ohno et al. | |
| 6,939,825 B1 * | 9/2005 | Ohno et al. | 502/439 |
| 7,119,046 B2 * | 10/2006 | Ohno et al. | 502/327 |
| 2004/0033175 A1 | 2/2004 | Ohno et al. | |
| 2004/0055265 A1 | 3/2004 | Ohno et al. | |

FOREIGN PATENT DOCUMENTS

| | | |
|---|---|---|
| BE | 1000795 | 4/1989 |
| EP | 0625371 | 11/1994 |
| EP | 0658363 | 6/1995 |
| EP | 0766993 | 4/1997 |
| EP | 0816065 | 1/1998 |
| EP | 0834343 | 4/1998 |
| EP | 0884457 | 12/1998 |
| EP | 1142619 | 10/2001 |
| EP | 1214973 | 6/2002 |
| JP | 57-10335 | 1/1982 |
| JP | 57-144039 | 9/1982 |
| JP | 61-7860 | 3/1986 |
| JP | 63218254 | 9/1988 |
| JP | 1-297145 | 11/1989 |
| JP | 4-40237 | 2/1992 |
| JP | 5-023512 | 2/1993 |
| JP | 5-68892 | 3/1993 |
| JP | 6-63423 | 3/1994 |
| JP | 6-24636 | 4/1994 |
| JP | 6-182214 | 7/1994 |
| JP | 9-158710 | 6/1997 |
| JP | 9-173866 | 6/1997 |
| JP | 9-220423 | 8/1997 |
| JP | 9-276708 | 10/1997 |
| JP | 10-099626 | 4/1998 |
| JP | 11-081983 | 3/1999 |
| JP | 2001-187344 | 7/2001 |
| JP | 2001-199777 | 7/2001 |

OTHER PUBLICATIONS

English Language Abstract of JP 4-40237.

(Continued)

*Primary Examiner*—Stuart Hendrickson
(74) *Attorney, Agent, or Firm*—Greenblum & Bernstein, P.L.C.

(57) ABSTRACT

The invention is a catalyst formed by covering each surface of particles in a ceramic support with an alumina thin film and holding an active catalyst component with the surface of the thin film, which is large in the pore size and porosity and small in the pressure loss irrespectively of forming the alumina thin film on the surface and is produced, for example, by immersing the ceramic support in an aluminum-containing metallic compound, preliminarily firing, immersing in hot water, drying, firing and finally holding the active catalyst component on the alumina thin film on the surface of the support.

26 Claims, 14 Drawing Sheets

OTHER PUBLICATIONS

English Language Abstract of JP 63-218254.
English Language Abstract of JP 62-45344.
English Language Abstract of JP 5-68892.
English language Abstract of JP57-144039.
English language Abstract of JP57-10335.
English language Abstract of JP6-63423.
English language Abstract of JP 61-7860.
English language abstract of BE 1000795 (provided by WPI/Derwent).
Two English language abstracts of JP 6-182214 (provided by Patent Abstracts of Japan and WPI/Derwent).
English language Abstract of JP 11-081983.
English language Abstract of JP 5-023512.
English Language Abstract of JP 1-297145.
English Language Abstract of JP 9-158710.
English Language Abstract of JP 9-173866.
English Language Abstract of JP 9-220423.
English Language Abstract of JP 9-276708.
English Language Abstract of JP 10-099626.
English Language Abstract of JP 2001-199777.
English Language Abstract of JP 2001-187344.

* cited by examiner

<< 1000°C 30h >>

(×10k)   (×30k)

$\Delta P = \Delta P1 + \Delta P2 + \Delta P3 + \Delta P4$

CATALYST AND METHOD FOR PREPARATION THEREOF

TECHNICAL FIELD

This invention relates to a catalyst for the purification of an exhaust gas and a method of producing the same, and more particularly to a catalyst capable of removing carbon monooxide (CO) and hydrocarbon (HC) included in the exhaust gas through oxidation, removing nitrogen oxide ($No_x$) by reduction efficiently, and being small in the pressure loss and high in the collection ratio of diesel particulates.

BACKGROUND ART

As a catalyst for purifying an exhaust gas of an automobile, for example, a catalyst (filter) purifying an exhaust gas of a diesel engine, there has hitherto been used a honeycomb type filter 100 wherein each cell 101 forming a path of the exhaust gas is shaped into a honeycomb form with a porous silicon carbide sintered body having excellent heat resistance and thermal conductivity and these cells 101 are alternately closed. It is usual to be a catalyst system that the honeycomb filter 100 is connected to an exhaust side of the diesel engine to decompose PM (particulate mass), HC, CO and so on deposited in the filer through oxidation.

As a catalyst, it is well-known that a holding layer made of γ-alumina is formed on a surface of a filtering wall (cell wall) 102 in a honeycomb-shaped heat-resistant support of, for example, cordierite or the like and further an active catalyst component made of a noble metal such as Pt, Pd, Rh or the like is held on the carrier layer.

As the support used for such a catalyst, JP-A=5-68892 discloses that fine powder obtained by added and mixing γ-alumina with an inorganic binder and pulv rizing them is made into a slurry, and th n the slurry is uniformly sprayed and coated or so-called wash-coated onto wall faces of a honeycomb support made of cordierite to from an alumina layer 103.

The alumina layer wash-coated by the conventional technique 103 (wash-coat alumina layer) is formed in a thin film uniformly coating a wall face of a filtering wall 102 as shown in FIG. 2(a), and has a pore structure as shown by a partial enlarged view in FIG. 2(b). A pore size in such a pore structure is mainly 20–500 Å, and a specific surface area is usually 50–300 $m^2$/g. And also, the alumina layer 103 is a catalyst holding layer for dispersion-supporting an active catalyst component such as a noble metal or the like on its surface, so that it is required to have a large specific surface area and a certain thickness (about 50–100 µm).

However, the wash-coat alumina layer 103 is small in the pore size and porosity and large in the passing resistance, so that there is a problem that the pressure loss considerably increases as compared with the support having no alumina layer.

Furthermore, since the wash-coat alumina layer 103 uniformly coats the surface of the support as a filtering wall 102 but also is poor in the adhesion property, so that it is feared to peel off from the support in the cleaning of ash deposited in the purification of the exhaust gas. As previously mentioned, the wash-coat alumina layer 103 is a pore structure, but the pore size is as small as 20–500 Å, so that when it is exposed to a higher temperature for a long time, the sintering proceeds and phase transition to α-phase is caused to decrease a surface area and hence there is caused a problem that the heat resistance is poor. Moreover, since the surface area is small, a distance between particles of the active catalyst component (noble metal) held on the alumina layer 103 becomes small and hence the specific surface area becomes more smaller as the sintering proceeds and ther is a problem that the catalytic action itself lowers.

As seen from the above, as one of important properties of the catalyst, it is important that the surface of the holding layer for the active component, particularly alumina holding layer covering the support is maintained at a stable state over a long time.

It is, therefore, an object of the invention to propose a catalyst having large pore size and porosity and small pressure loss and a high collecting efficiency of diesel particulates though an alumina thin film is formed on a surface of a support as well as a method of producing the same.

It is another object of the invention to propose a catalyst having a large specific surface area of an alumina layer as a catalyst holding layer and an excellent holding property (fixation property) of an active catalyst component and an excellent heat resistance as well as a method of producing the same.

It is the other object of the invention to propose a catalyst having an excellent holding property (fixation property) of an active catalyst component and excellent heat resistance, regeneration property and wash resistance as well as a method of producing the same.

DISCLOSURE OF THE INVENTION

As means for solving the above objects, the invention is fundamentally a catalyst comprising a porous ceramic support, particularly silicon-containing support and an active catalyst component dispersion held on a surface thereof, wherein each surface of particles constituting the ceramic support is covered with a thin film of alumina, particularly alumina thin film containing a rare earth oxide. And also, it is advantageous to use a catalyst wherein the active catalyst component is held on irregular surfac s of the alumina thin film cov ring the surface of each particle.

The ceramic support, particularly silicon-containing ceramic support in a preferable embodiment is favorable to be constructed with a silicide support containing a non-oxide ceramic such as silicon carbide, silicon nitride or the like, or an oxide ceramic such as sialon, mullite, cordierite or the like.

The silicon containing ceramic support is used as a porous body, fiber-shaped body or pellet-shaped body, preferably is formed in a honeycomb-shaped porous silicon carbide sintered body. Particularly, a preferable embodiment is a support having $SiO_2$ layer on its surface, an amount of which in the support is 0.001–20 mass %.

In the invention, the alumina thin film covering the surface of each particle in the ceramic support contains a rare earth oxide such as ceria ($CeO_2$), lanthana ($La_2O_3$) or the like in its surface and/or inside and a micro-sectional form thereof shows a haired structure that fine fibers having a diameter: 2–50 nm, a length: 20–300 nm and a ratio of total length/diameter of 5–100 are forested with each other. In a preferable embodiment, the alumina thin film is an amount of 0.1–15% mass % as an alumina amount based on the support.

In another embodiment of the invention, the rare earth oxide-containing alumina thin film covering the support is covered in an amount of 0.1–15 mass % as converted by an alumina amount based on the support, and the rare earth oxide contained in the alumina thin film has a content of 10–80 mass % based on the alumina.

In the other preferable embodiment of the invention, at least a part of the rare earth oxide is a composite oxide with zirconium.

In a further preferable embodiment of the invention, a particle size of the composite oxide of the rare earth oxide with zirconium is a size of 1–30 nm.

The catalyst support can b produced by forming an alumina thin film or a rar earth oxide-containing alumina thin film made from a rare earth oxide and alumina on a surface of each particle constituting a ceramic support, particularly silicon-containing ceramic support through the following steps (a)–(e) and then holding an active catalyst component such as a noble metal or the like on irregular surfaces of such an alumina thin film.
(a) solution impregnation step: the support is immersed in a solution of aluminum alone or a metallic compound containing a rare earth oxide and aluminum.
(b) drying step: the support is dried by heating.
(c) preliminary firing step: the support is fired by heating to a temperature above 300–500° C. to form an amorphous alumina thin film or a rare earth oxide containing amorphous alumina thin film.
(d) heat treating step: the support is immersed in a hot water of 100° C. and dried.
(e) firing step: the support is fired at 500–1200° C.

And also, in the other production method according to the invention, the catalyst can be produced by forming an alumina thin film or a rare earth oxide-containing alumina thin film containing a rare earth oxide and alumina on a surface of each particle constituting a ceramic support, particularly silicon-containing ceramic support through the following steps (a)–(f) and then holding an active catalyst component such as a noble metal or the like on irregular surfaces of such an alumina thin film.
(a) preliminary treating step: the silicide ceramic support is heated to a temperature of 1000–1500° C. to form an oxide of the silicide.
(b) solution impregnation step: the support is immersed in a solution of aluminum alone or a metallic compound containing a rare earth oxide and aluminum.
(c) drying step: the support is dried by heating.
(d) preliminary firing step: the support is fired by heating to a temperature abov 300–500° C. to form an amorphous alumina thin film or a rare earth oxide containing amorphous alumina thin film.
(e) heat treating step: the support is immersed in a hot water of 100° C. and dried.
(f) firing step: the support is fired at 500–1200° C.

Moreover, in each production method according to the invention, the composition, structure and properties of the ceramic support, particularly silicon-containing support are as mentioned above. And also, the alumina thin film covering each ceramic particle surface is the same as mentioned above.

Further, at least a part or whole of the rare earth oxide is a composite oxide with zirconium, and a particle size thereof is a size of 1–30 nm as mentioned above.

As the active catalyst component is used at least one metal selected from the group consisting of Pt, Rh, Pd, Ce, Cu, V, V, Fe, Tu and Ag, or an alloy or a compound thereof.

BEST MODE FOR CARRYING OUT THE INVENTION

In the catalyst according to the invention, a filtering wall 2 of a support 1 is formed with a porous silicon-containing ceramic sintered body made of a ceramic, particularly a silicon-containing ceramic, for example, silicon carbide as a preferable embodiment (hereinafter referred to as "porous SiC sintered body" simply) and a surface of the filtering wall 2, particularly each surface of SiC particles is covered with an alumina thin film as a catalyst holding layer at a given thickness and an active catalyst component such as Pt, Pd or the like (hereinafter referred to as "active component" simply) is held on the alumina thin film.

Figure 1:
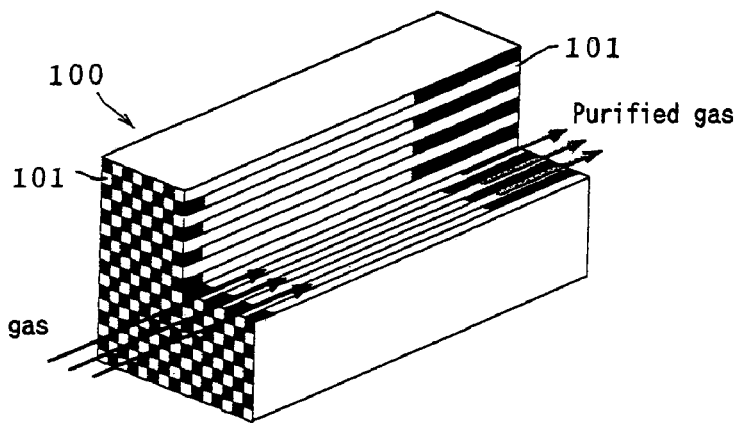
FIG. 1 is a schematic view of a typical catalyst support.
Figure 1:
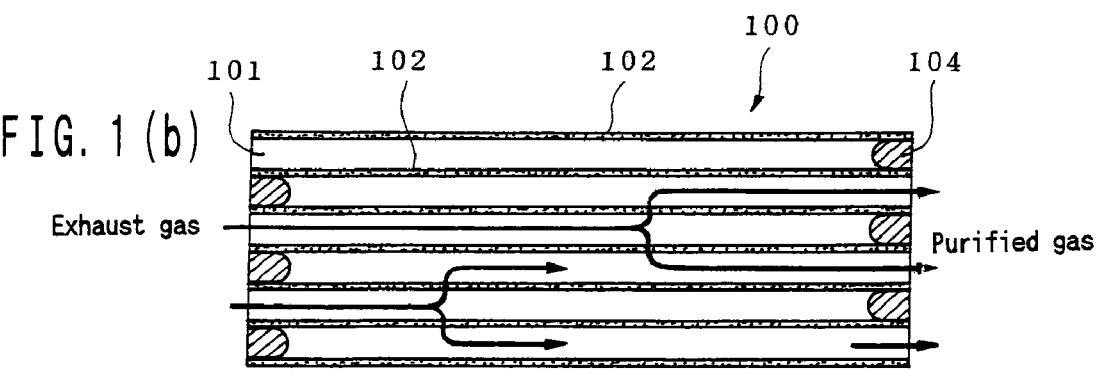

As the ceramic support used in the catalyst according to the invention, there can be used ones obtained by adding and mixing silicon carbide powder, silicon nitride powder, oxide ceramic or a silicon-containing ceramic powder of an oxide such as sialon, mullite, cordierite or the like with an organic binder, a lubricant, a plasticizer and water, extrusion-shaping them and sintering. In this way, a wall-flow honeycomb type filter is formed as shown in FIG. 1.

As an example of silicon-containing ceramic support, there will be described an example using SiC sintered body b low.

The support (filter) 1 is constructed with SiC sintered body of substantially a square in section wherein plural through-holes (cells) are regularly formed along an axial line direction thereof. These cells are separated from each other through a filtering wall 2 (which may be called as "cell wall 2" hereinafter), and arranged so as to show a checkered pattern wherein opening portion of each cell is sealed at its one end face side with a sealing body 104 and opened at the other end face side and each end face as a whole is an opened part or a sealed part. And also, many cells 101 having a square shape at section are formed in the support (filter) 1 of the SiC sintered body. In other words, such a filter has a honeycomb structure.

Moreover, a density of the cell 101 is about 200 cells/square inch. That is, about a half of these cells 101 are opened at upstream side end faces, and the reminder is opened at downstream side end faces, and a thickness of the cell wall 2 separating the cells 101 from each other is set to be about 0.4 mm.

Figure 3:
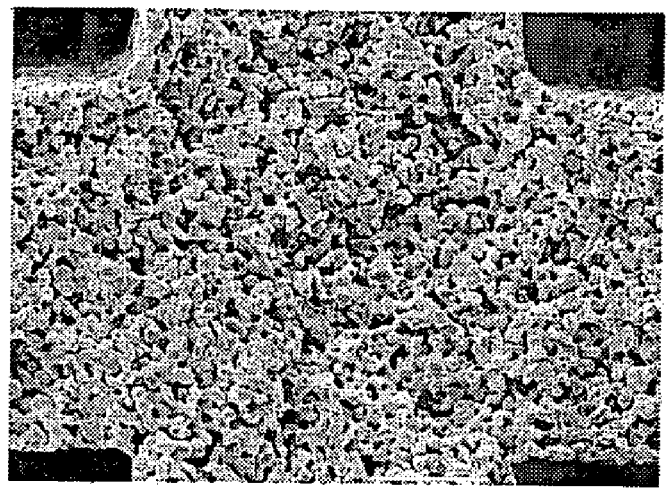
FIGS. 3(a), (b) and (c) are conceptual views of an alumina thin film according to the invention, respectively.
Figure 3:
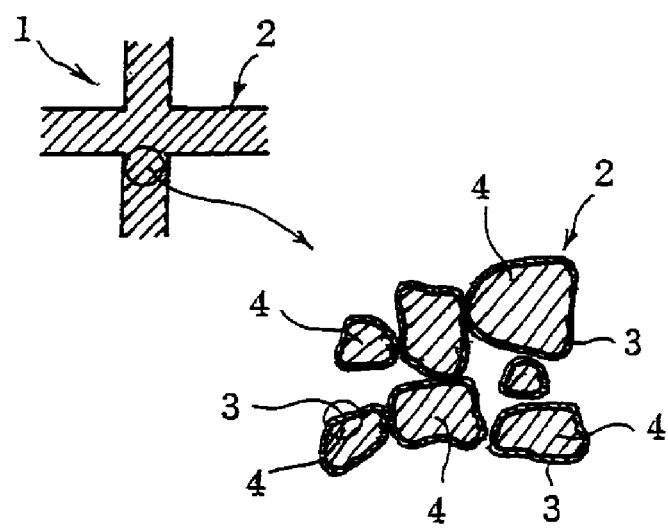
Figure 3:
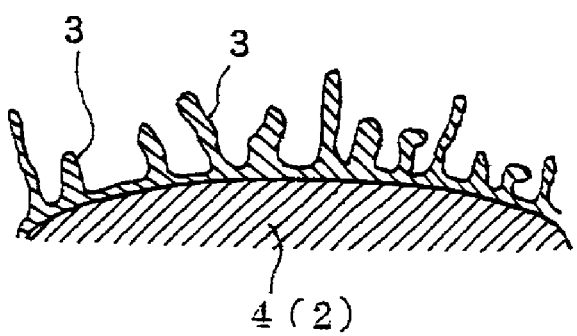

The support 1 of the SiC sintered body has a structure of partitioning with porous cell walls 2 as shown in FIG. 3(*a*). It is favorable that pores in the porous cell wall 2 has an average value of pore size of 5 µm–15 µm as measured by a mercury pressure process and a value of standard deviation in pore size distribution when the pore size is represented by customary logarithm is not more than 0.20.

When the cell wall 2 has a pore size of the above range, it is also suitable for collecting fine particulates. That is, when the average pore size of the cell wall 2 is set to the above range, diesel particulates can surely be collected. On the other hand, when the average value of the pore size of the cell wall 2 is less than 5 µm, the pressure loss when the exhaust gas passes through the inner wall becomes extremly large and there is a risk of stopping the engine, while when the average value of the pore size exceeds 15 µm, fine particulates can not efficiently be collected.

In the production of the support 1, a starting material is formed by compounding 70 parts by weight of silicon carbide powder having an average particle size of about 10 µm, about 30 parts by weight of silicon carbide powder having an average particle size of about 0.5 µm, about 6 parts by weight of methyl cellulose as a binder based on 100 parts by weight of the ceramic powder, about 25 parts by weight of a dispersion consisting of an organic solvent and water based on 100 parts by weight of the ceramic powder. Then, the starting material is milled and extruded into a honeycomb shape and thereafter a part of cells 101 is sealed to form a checkered pattern. Next, the resulting shaped body is dried and degreased and fired in an inert atmosphere at 2200° C. for 4 hours to obtain a desired ceramic support.

For example, when the ceramic support, particularly silicon-containing ceramic support is porous silicon carbide, the silicon content is favorable to be 0.01–10 mass %. Because, when the silicon content is less than 0.01 mass %, Si feeding ability is lacking and the effect of improving the heat resistance is less, while when the silicon content exceeds 10 mass %, the strength of the honeycomb filter lowers. Even in the other silicon-containing ceramics, the silicon content is favorably 0.01–10 mass % likewise the above case, more preferably 0.01–5 mass %, further preferably 0.01–2 mass %.

A most important feature in the invention lies in that the surface of the cell wall 2 in the support 1, particularly each surface of ceramic particles constituting the cell wall 2 is separately covered with an alumina thin film. More concretely, each particle surface of the SiC sintered body constituting the cell wall 2 is separately covered with the alumina thin film by various methods. That is, the cell wall 2 is constructed as an aggr gate of the ceramic particles each covered with the alumina thin film.

Figure 2:
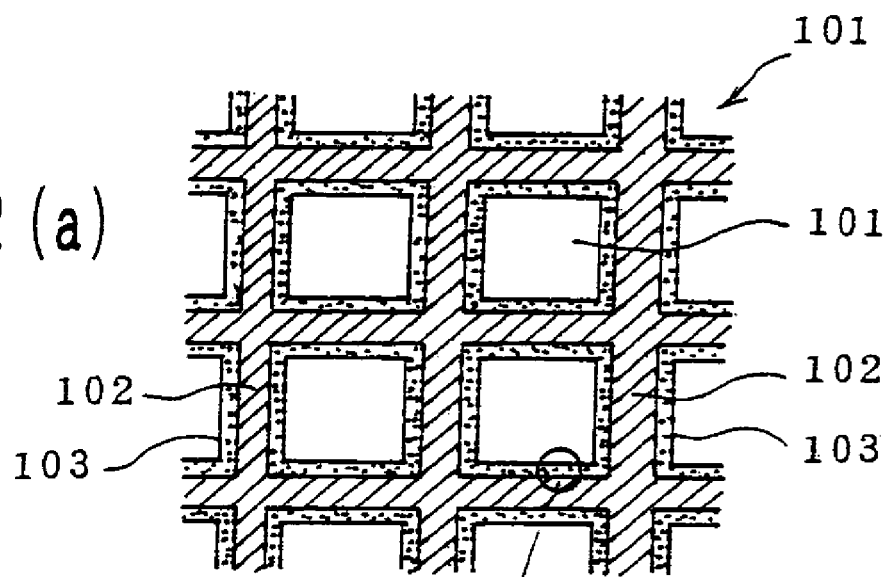
FIG. 2 is a conceptual view of the conventional wash-coat alumina layer.
Figure 2:
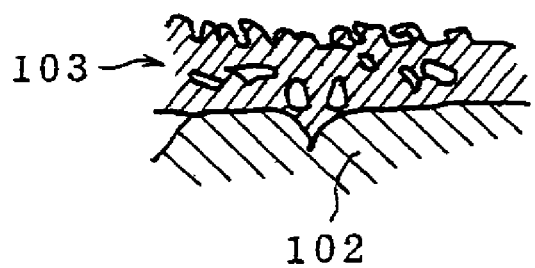

Moreover, FIG. 2(*b*) shows the conventional technique that an alumina layer 103 is uniformly coated and formed on the surface of the cell wall 102 by a wash-coat method. On the other hand, FIGS. 3(*b*) and (*c*) are diagrammatic views of a support used in the invention, wherein each surface of SiC particles 4 constituting the cell wall 2 is separately covered with the alumina thin film 3 (means both a case containing rare earth oxide and a case containing no rare earth oxide, hereinafter abbreviated as "alumina thin film" simply).

Thus, the holding film (alumina thin film) as a characteristic feature in the catalyst according to the invention is not formed by a method wherein the alumina layer 103 is merely uniformly coated onto the wall face of the cell wall 2 as a filtering wall for exhaust gas as disclosed in the conventional technique. For example, when such a wall face is uniformly coated, gaps between the particles are sealed to obstruct the permeation. On the contrary, in case of the support used in the invention, each surface of the SiC particles constituting the cell wall 2 is separately covered with the alumina thin film 3. In the invention, therefore, the pores are maintained as they are without clogging the pores of the cell wall 2 itself, i.e. the gap produced between the particles, so that the pressure loss is considerably small as compared with the conventional alumina thin film 103. And also, the heat resistance is excellent, and further the alumina thin film 3 separately covers each SiC particle itself, so that when, for example, the washing is conducted, the thin film is not peeled off from the cell wall and becomes excellent in the washing resistance.

Figure 4:
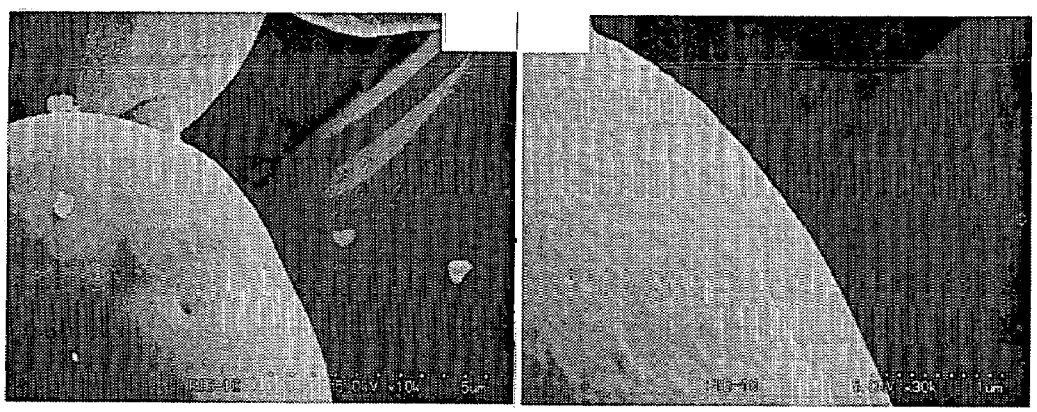
FIG. 4 is an electron microphotograph showing a particle structure of a catalyst support.
Figure 4:
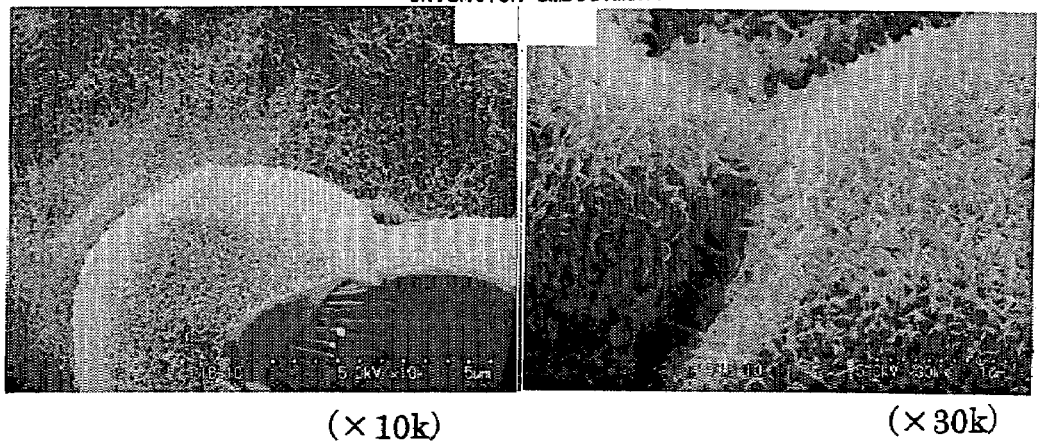

FIG. 4 shows a comparison between an electron microphotograph (×10K), (×30K) of the ceramic support formed by covering each surface of SiC particles with the alumina thin film (invention) and an electron microphotograph (×10K), (×30K) of the ceramic support formed by uniformly covering the surface of the cell wall with the alumina film (conventional technique). In the invention, alumina are forested on the each surface of SiC particles in needle form (fibrous form), which is clearly seen to be an apparently haired structure as shown in FIG. 3(*c*).

The structure of the alumina thin film required in the catalyst according to the invention, i.e. crystal structure of the alumina thin film formed by covering each surface of particles such as SiC or the like contains at least one of $\gamma\text{-Al}_2\text{O}_3$, $\delta\text{-Al}_2\text{O}_3$ and $\theta\text{-Al}_2\text{O}_3$, wherein a diameter of fibrous protruded alumina constituting the alumina thin film is 2–50 nm and a length thereof is 20–300 nm and a ratio of total length/diameter is 5–50. And also, a thickness of the thin film is not more than 0.5 µm, and a specific surface area of alumina as an alumina is favorable to be 50–300 $m^2/g$. The thickness of alumina thin film used herein means an average of (distances from the surface of the SiC particle to tops of alumina fibers protruded therefrom. Moreover, the diameter of alumina is more desirably 5–20 nm, and the ratio of total length/diameter is more desirably 10–30.

The reason why the properties of the fibrous protruded alumina thin film are restricted a mentioned above is due to the fact that when the length of the fibrous protruded alumina is less than 20 nm, it is difficult to ensure the surface area, while when it exceeds 300 nm, the structure becomes brittle. And also, when the diameter is less than 2 nm, it is equal to or smaller than the size of the catalyst such as noble mental or the like and does not act as a holding layer, while when it exceeds 50 nm, it is difficult to ensure the desired specific surface area. Furthermore, when the ratio of total length/diameter is less than 5, it is difficult to ensure the required specific surface area, while when it exceeds 50, the structure becomes brittle and there is caused a case that the fibrous protrusions are broken by washing operation or the like.

Moreover, the reason why the specific surface area of the alumina thin film is restricted as mentioned above is due to the fact that when the specific surface area is less than 50 m$^2$/g, sintering of the fibrous protruded alumina excessively proceeds and the durability is poor, while when it exceeds 300 m$^2$/g, the fibrous protruded alumina becomes finer and does not act as so-called holding layer and structurally brittle. Moreover, a preferable specific surface area is a range of 50–200 m$^2$/g.

In the above ceramic support, an amount of alumina thin film as a holding layer is preferable to be 0.5–15 mass % as an alumina ratio. When it is less than 0.5 mass %, the effect of improving the heat resistance is small, while when it exceeds 15 mass %, the pressure loss increases and the filtering function lowers. A preferable amount is 1–4 mass %.

Then, the pressure loss property, heat resistance, washing resistance and regenerating property are explained with respect to the alumina thin film used as a holding layer for the catalyst according to the invention.

Figure 5:
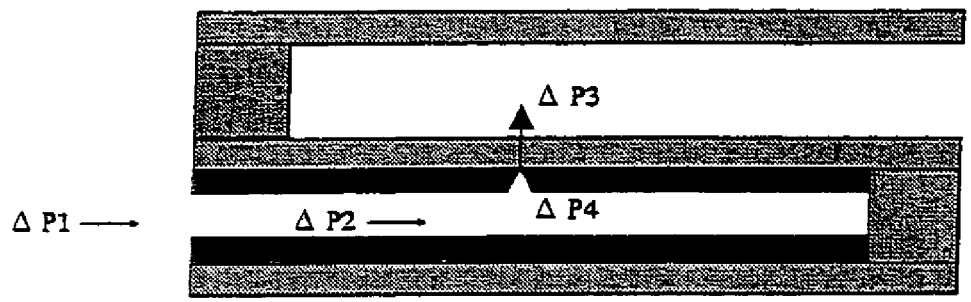
FIG. 5 is a schematic view of a pressure loss.

Pressure Loss Property;

In general, the pressure loss property when the exhaust gas passes through the cell wall, as a filtering wall is considered as follows. That is, the pressure loss when a diesel exhaust gas passes through the support (filter) can be shown in FIG. 5. In this case, resistances $\Delta P1$ (resistance due to the narrowing of the opening in the path), $\Delta P2$ (resistance passing through small tube) and $\Delta P3$ (resistanc passing through wall) are dependent upon a cell structure of a filter, which are a constant value $\Delta pi = (\Delta P1 + \Delta P2 + \Delta P3)$ not influenced by deposition of diesel particulates and the like and are called as an initial pressure loss. And also, $\Delta P4$ is a resistance passing through deposited diesel particulates and is a value of 2–3 times or more of the initial pressure loss.

A surface area of the support having a cell structure of $^{14}/_{200}$ is 8.931 cm$^2$/cm$^3$ and a density of the support is 0.675 g/cm$^3$, so that a surface area of cell walls is 0.0013 m$^2$/g. On the other hand, the surface area of the fine pore in the cell wall is 0.12 m$^2$/g as measured by a mercury porosimeter and is about 100 times the surface area of the cell wall. This means that when the thin film is formed by covering the surface of the cell wall with the same amount of alumina, if the surface of each particle constituting the cell wall is covered with the alumina than a case that the surface of the cell wall is merely and uniformly covered with the alumina, the thickness of alumina can be rendered into $^1/_{100}$ for obtaining the same effect.

That is, when the alumina thin film is evenly formed by the conventional technique such as wash coat or the like, in order to cover alumina of about 3 mass % required for the activation of the catalyst, the thickness of the alumina layer is required to be 50 μm. In this case, as the pressure loss, a resistance passing through the alumina layer increases in addition to the resistance $\Delta P3$ passing through the inside of the cell wall. Further, as the opening, becomes small, $\Delta P1$ is large. For this end, the pressure loss becomes considerably large as compared with the filter not coated with the alumina. This tendency becomes more conspicuous when the particulates are deposited on the filter.

In this point, when alumina is coated onto each surface of the SiC particles constituting the cell wall as in the support used in the invention, in order to form the alumina thin film of about 3 mass % required for the activation of the catalyst, the thickness is about 0.5 μm at maximum. In this case, as the increase of the pressur loss, the resistance $\Delta P3$ is slightly increased, but the other pressure loss can substantially be ignored, so that the pressure loss property is considerably improved as compared with that of the conventional washcoat layer.

Heat Resistance of Alumina Thin Film;

In general, alumina has a high specific surface area and is suitable as a catalyst carrying film. particularly, it is presently desired to develop a catalyst having a high heat resistance stably operating at a higher temperature, and the alumina carrying film is required to have a higher heat resistance accompanied therewith.

In this connection, according to the invention, in order to improve the heat resistance of the alumina, ① the shape of each alumina particle is rendered into a fine fiber and ② a rare earth oxide such as ceria or the like is included.

Particularly, in case of adopting the structure of the former case ①, contact points between the alumina particles can be decreased, and the particle growth is controlled by lowering the sintering rate and hence the specific surface area can be increased to improve the heat resistance.

That is, in the invention, the alumina thin film covering each surface of the particles of the support shows a haired structure at its micro-section that the alumina particles are forested in form of fine fibers, so that mutual contact points of the adjoining alumina fine fibers decrease and hence the heat resistance is considerably improved.

Then, as to the item ②, the heat resistance is improved by the addition of ceria or the like. The reason is due to the effect of forming a new compound on the surface of the crystal grains constituting the alumina to obstruct the growth of the alumina particles with each other.

Moreover, in the invention, Si is supplied from SiC or SiO$_2$ existing on a surface layer of SiC, which acts to shield a mass transfer path to thereby improve the heat resistance. According to the inventors' studies, it has been confirmed that when SiC is intentionally treated at a high temperature to form an oxide, the heat resistance is further improved.

Wash Resistance of Alumina Thin Film;

The particulate deposited on the surface of the cell wall is mainly carbon, which can be removed through oxidation by a method such as combustion or the like. However, substances are retained as an ash after the combustion. They are oxides or sulfates of compounds of Ca, Mg, Zn and the like adding to an engine oil for serving as a neutralizing agent, a lubricant or the like, or deposits of a catalyst such as CeO$_2$, CuO or the like included in a fuel for combusting carbon together with the particulates on the surface of the filter. These ashes are deposited to increase the pressure loss of the filter during the running of the vehicle over a long time, so that they are necessary to be washed with a high pressure water or the like. In this case, the ashes can completely be removed by washing at a pressure of not less than 30 kg/cm$^2$.

In this connection, in case of the conventional alumina uniform film formed on the surface of the cell wall by the wash coat, there is a thick coat layer through physical adsorption on the whole surface of the cell wall, so that almost of such a layer is frequently peeled by the above washing.

On the contrary, in the carrier (alumina thin film) used in the invention, the surface of each particle constituting the SiC carrier is thinly covered with the alumina, and Si is supplied from SiC constituting the carrier and chemically bonded to closely adhere particles to each other, so that the adhesion property is high and hence the resistance to washing is high and the durability as a coating is strong.

Regeneration Property of Alumina Thin Film;

In the invention, it is favorable to use the alumina thin film wherein a rare earth oxide such as ceria ($CeO_2$) or lanthana ($La_2O_3$) is added in an amount of about 10–80 mass %, preferably 20–40 mass % to $Al_2O_3$ to uniformly disperse these oxides in the surface and inside of the thin film.

If ceria or the like is added to the inside of the alumina thin film (which is preferably desired to be added together with an active catalyst component such as Pt or the like), the supply of oxygen into the exhaust gas is activated by the action of adjusting oxygen concentration inherent to the ceria to improve the efficiency of combustion-removing "soot (diesel particulates)" adhered to the filter and hence considerably improve the regeneration ratio of the catalyst support.

That is, the rare earth oxide such as ceria or the like serves to not only improve the heat resistance of the alumina but also adjust the oxygen concentration on the surface of the catalyst. In general, hydrocarbon or carbon monooxide existing in the exhaust gas are removed by an oxidation reaction and NOx is removed by reduction reaction. However, the composition of the exhaust gas always varies between rich region and lean region of the fuel, so that an atmosphere acting to the surface of the catalyst violently varies. The ceria added to the catalyst is relatively small in an oxidation-reduction potential between $Ce^{3+}$ and $Ce^{4+}$, so that a reaction of the following formula:

reversibly proceeds. That is, as the exhaust gas renders into a rich region, the above reaction proceeds to a right direction and hence oxygen is supplied to the atmosphere, while as the reaction proceeds to a left direction, extra oxygen in the atmosphere is inversely absorbed. In this way, the oxygen concentration is adjusted in the atmosphre, so that ceria serves to widen an air-fuel ratio capable of efficiently removing hydrocarbon, carbon monooxide or NOx.

Figure 6:
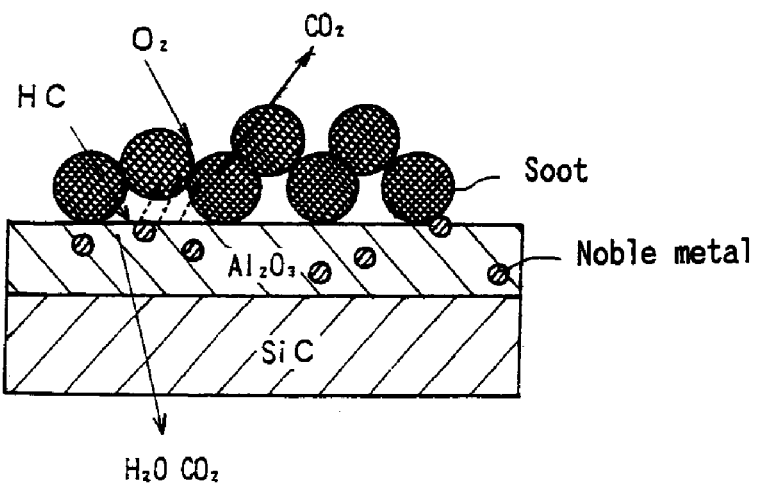
FIG. 6 is a diagrammatical view explaining a mechanism of improving an oxidation rate by addition of $CeO_2$.
Figure 6:
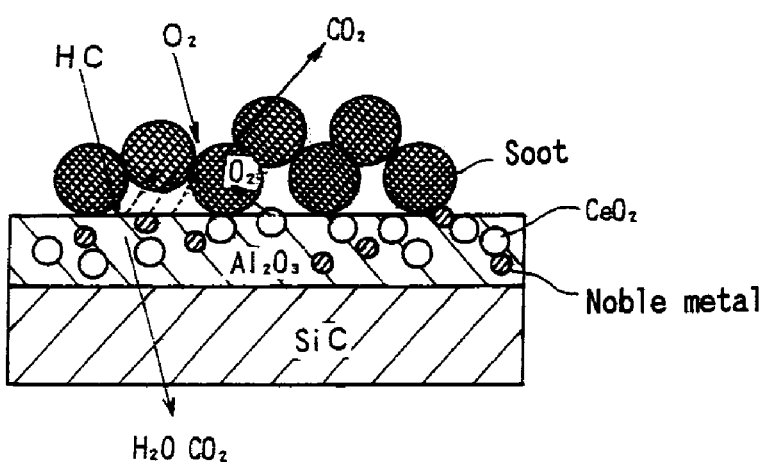

FIG. 6 explains a mechanism of oxidation rate on each catalyst when $Al_2O_3$ thin film (a) not added with ceria ($CeO_2$) or $Al_2O_3$ thin film (b) added with ceria is used as a holding film.

As shown in FIG. 6, the catalyst (a) containing no $CeO_2$ oxidizes soot by activating oxygen in the exhaust gas. In this reaction, oxygen in the fluid should be activated, so that the efficiency is poor.

On the other hand, the catalyst (b) containing $CeO_2$ supplies oxygen according to the following reaction;

That is, oxygen discharged into an atmosphere and oxygen in the exhaust gas react are activated by the catalyst (noble metal) and react with soot (carbon) to form $CO_2$ ($CeO_{2-x}$ is oxidized into original $CeO_2$). And also, $CeO_2$ and the soot directly contact with each other, so that even if an amount of oxygen discharged is small, the soot can be efficiently oxidized.

Furthermore, $CeO_2$ holds the catalyst (noble metal) to increase OSC (oxygen storing capacity). Because, the catalyst (noble metal) activates oxygen in the exhaust gas and also oxygen on the $CeO_2$ surface near to the noble metal is activated to increase the above OSC.

Figure 7:
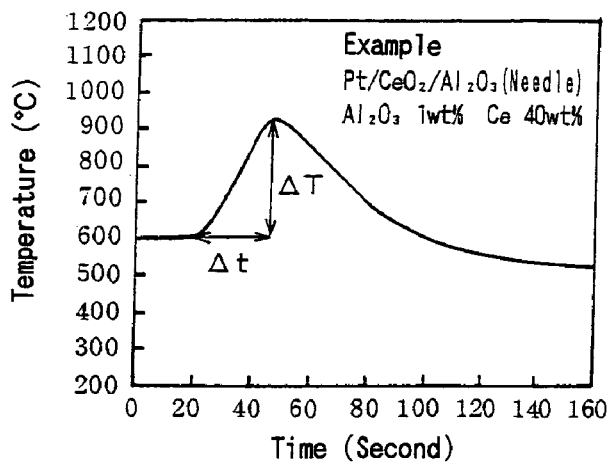
FIG. 7 is a comparative graph showing oxidation characteristic of soot upon regenerating property of DPF.
Figure 7:
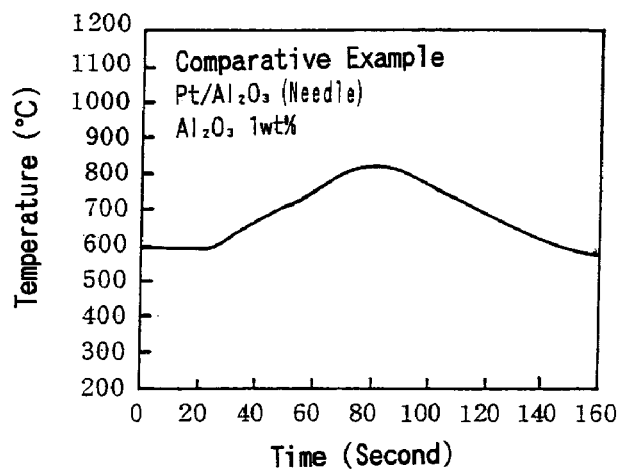
Figure 7:
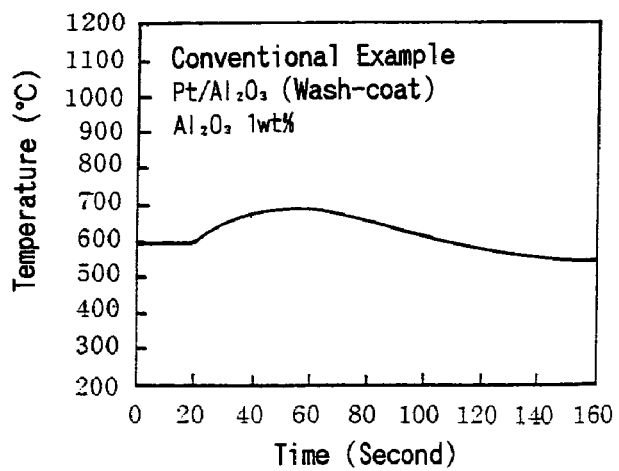
Figure 8:
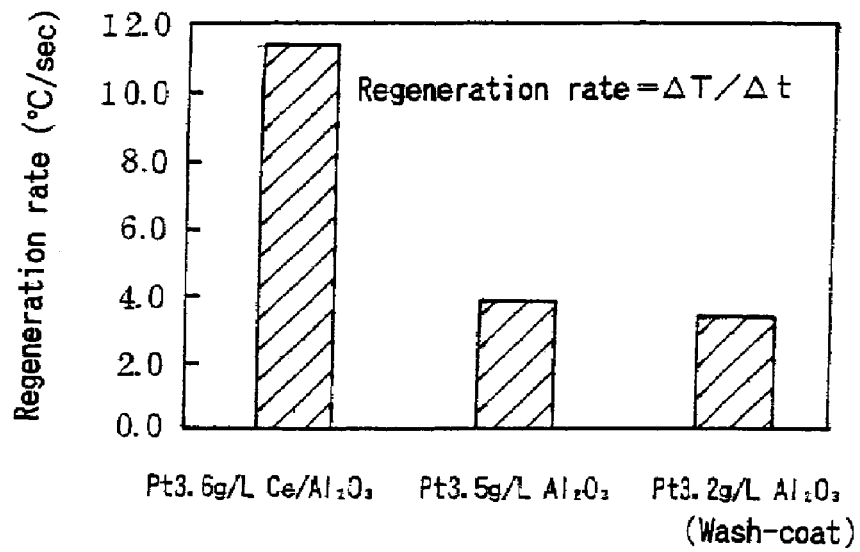
FIG. 8 is a comparative graph showing a regenerating rate upon a regenerating property of DPF.

FIGS. 7 and 8 show experimental results on regeneration properties of Pt/$CeO_2$/needle $Al_2O_3$ catalyst (invention example) and Pt/needle $Al_2O_3$ (comparative example) and Pt/$Al_2O_3$ (wash coat) catalyst with respect to the effect of adding the rare earth oxide such as ceria or the like to the alumina thin film, respectively. In this experiment, the diesel particulate filter adhered with the soot (grime) (DPF, full length=150 mm) is placed in an electric furnace and heated to 650° C., while a diesel engine of 1100 rpm and 3.9 Nm is connected thereto to introduce the exhaust gas (350° C.) into the filter, whereby a change of a filter temperature (measured at a position separated from an inlet port to 145 mm)(FIG. 7) and a regeneration (combustion) rate (ratio of rising temperature $\Delta T$ to lapse time $\Delta t$, FIG. 8) are measured.

As shown in FIG. 7, it has been confirmed that the conventional example (wash-coat alumina) have a peak temperature at 50 sec–700° C. as $O_2$ becomes rate-determining, and the comparative example (no ceria) have a peak temperature at 80 sec–800° C. as $O_2$ becomes rate-determining, while the invention example has a peak temperature at a faster rate of 45 sec–900° C. and is high in the efficiency of removing the soot through oxidation and shows a high regeneration ratio. This clearly appears as a difference of regeneration (combustion) rate in FIG. 8.

Figure 9:
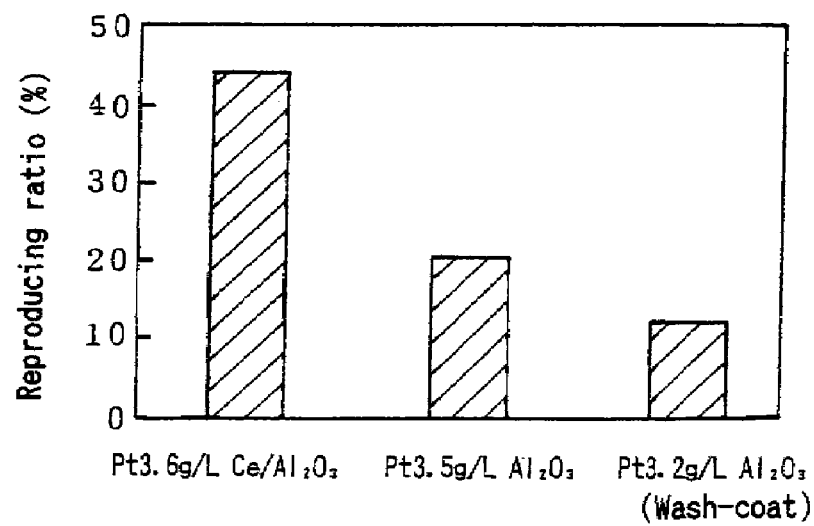
FIG. 9 is a comparative graph on a regenerating ratio of DPF.

And also, FIG. 9 shows a comparison of the regeneration ratios themselves, from which it is clear that the effect in the invention example (ceria containing catalyst) becomes conspicuous.

Moreover, as the rare earth oxide, it is more favorable to use a composite oxide of, for example, rare earth element and zirconium in addition to the single oxide ($CeO_2$) as mentioned above. It is considered that since zirconium oxide is included in the rare earth oxide, the grain growth of the rare earth oxide is suppressed to improve the property of controlling the oxygen concentration.

The rare earth oxide taking a form of a composite oxide with zirconium is favorable to have a particle size of about 1–30 nm, more preferably 2–20 nm. When the particle size is less than 1 nm, it is difficult to produce the composite oxide. While, when the particle size exceeds 30 nm, the particles are apt to be sintered and the surface area of the particle becomes small and hence the contact area with the exhaust gas becomes small and there is left a problem that the activity weakens. Further, there is a problem that the pressure loss in the passing of the exhaust gas becomes large.

Onto the above ceramic support wherein each surface of the ceramic particles is covered with the alumina thin film as mentioned above and the surface of the support is apparently covered with the alumina thin film (holding film) as a whole, an active component such as Pt, Rh, Pd, Ce, Cu, V, Fe, Au, Ag or the like is held to form a catalyst.

Various methods are considered for holding the active component onto the alumina carrying thin film. As a method advantageously usable for the invention, impregnation method such as an evaporation drying method, an equilibrium adsorption method, an incipient wetness method or a spraying method is applicable. Among them, the incipient wetness method is advantageous. This method is a method wherein an aqueous solution containing a given amount of the active component is added dropwise onto the support and at a time of uniformly and slightly wetting the surface of the support (Incipient), the impregnation of the active component into pores of the support is stopped and then the drying and firing are carried out. That is, it is carried out by dropwisely adding the active component containing solution onto the surface of the support with a burette or an injection cylinder. The holding amount is adjusted by a concentration in the solution.

Moreover, binary, ternary alloys such as Pt/Rh system, Pt/Rh/Pd system and the like are used as a noble metal component usable as the active catalyst component. They are used as a cocatalyst as mentioned above. For example, it is advantageous to use the rare earth oxide such as ceria, lanthana or the like, and such a catalyst is less in the deterioration through poison (lead poison, phosphorus poison, sulfur poison) and small in the thermal deterioration and is excellent in the durability.

Then, a method of producing the catalyst support according t the invention will be describ d.

A characteristic of the method of producing the catalyst according to the invention lies in a point that an alumina thin film or an alumina thin film containing a rare earth oxide is formed on irregular surfaces formed by particles of the ceramic support, particularly silicon-containing ceramic support through a sol-gel method. Particularly, each particle surface of the ceramic particles such as SiC or the like forming the cell wall is covered with the alumina thin film through immersion of the solution, and then preliminarily fired and subjected to a step of treating with hot water, whereby the micro-sectional structure of the alumina thin film is changed into an alumina thin film (holding film) having a haired structure of foresting fine fibers of alumina and a given amount of an active component is adsorbed and fixed (held) onto the surface of the alumina thin film.

Each step ((1) formation of support, (2) holding of active component) will be described in detail below.

(1) Covering of Ceramic Support with Alumina Thin Film a. Preliminary Treating Step This step is a treatment wherein oxidation is carried out by heating at 800–1600° C. for 5–100 hours for providing Si amount assisting chemical bonding with alumina onto each surface of silicon containing ceramic particles such as SiC or the like. Of course, if sufficient oxide film is existent on the surface of the ceramic particle, this step may be omitted. For example, SiC sintered body itself contains about 0.8 mass % of $SiO_2$. This is existent onto the surface of SiC or in the grain boundary thereof, from which it is easily guessed to supply Si. Further, it means to increase $SiO_2$ for improving the heat resistance, and in this case, it is desirable to heat in an oxidizing atmosphere at 800–1600° C. for 5–100 hours; When the temperature is lower than 800 BC, the oxidation reaction hardly occurs, while when it exceeds 1600° C., the oxidation reaction excessively proceeds and the strength of the filter lowers. The recomm ndable conditions are 1000–1500° C. and 5–20 hours. When this condition is satisfied, $SiO_2$ enough to supply Si can be formed on the surface and the porosity and pore size in the filter are hardly changed and the pressure loss property is not damaged.

b. Solution Impregnation Step

This step is a treatment wherein a solution of aluminum or a metallic compound containing aluminum and a rare earth oxide is impregnated into each surface of the ceramic particles constituting the cell wall of the support by a sol-gel method to cover alumina thin film.

In the preparation of the solution of the aluminum containing metal compound, there are inorganic metal compounds and organic metal compounds as a starting metal compound. As the inorganic metal compound are used $Al(NO_3)_3$, $AlCl_3$, $AlOCl$, $AlPO_4$, $Al_2(SO_4)_3$, $AlPO_4$, $Al_2(SO_4)_3$, $Al_2O_3$, $Al(OH)_2$, Al and so on. Among them, $Al(NO_3)_3$ and $AlCl_3$ are particularly favorable because they are easily dissolved in a solvent such as an alcohol, water or the like and easy in the handling.

As the organic metal compound, there are a metal alkoxide, a metal acetylacetonate, and a metal carboxylate. Concretely, there are $Al(OCH_3)_3$, $Al(OC_2H_3)_3$, $Al(iso-OC_3H_7)_3$ and so on.

Among the aqueous mixed solutions, $Ce(NO_3)_3$, $CeCl_3$, $Ce_2(SO_4)_3$, $CeO_2$, $Ce(OH)_3$, $Ce_2(CO_3)_3$ and the like are used in a solution of the cerium-containing compound.

As the solvent at least one of water, alcohol, diol, polyvalent alcohol, ethylene glycol, ethylene oxide, triethanol amine xylene and so on is used considering the dissolution into the above metal compound.

As a catalyst in the preparation of the solution may be added hydrochloric acid, sulfuric acid, nitric acid, acetic acid or hydrofluoric acid. Further, it is ffective to add Li, K, Ca, Sr, Ba, La, Pr, Nd, Si or Zr alone or a compound thereof to the starting material in order to improve the heat r sistance of alumina.

In the invention, $Al(NO_3)_3$ and $Ce(NO_3)_3$ may be mentioned as a recommended metal compound. Because, they can be dissolved at a relatively low temperature to easily form a starting solution. And also, 1,3-butane diol is recommended as the solvent. As a first reason, the viscosity is adequate and it is possible to form a gel film of a proper thickness on SiC particle at a gel state. As a second reason, this solvent forms a metal alkoxide in the solution and may form a metal oxide polymer consisting of oxygen-metal-oxygen or a precursor of a metal oxide gel.

An amount of $Al(NO_3)_3$ is desirable to be 10–50 mass %. When it is less than 10 mass %, alumina amount having a surface area for maintaining the activity of the catalyst over a long time can not be held, while when it exceeds 45 mass %, heat generation quantity in the dissolution becomes large and gelation easily occurs.

And also, an amount of $Ce(NO_3)_3$ is desirable to be 1–30 mass %. When it is less than 1 mass %, the oxidation can not proceed, while when it exceeds 30 mass %, the grain growth of $CeO_2$ after the firing occurs.

On the other hand, a mixing ratio of $Al(NO_3)_3$ to $Ce(NO_3)_3$ is favorable to be 10:2. The reason is due to the fact that the dispersing degree of $CeO_2$, particles after the firing can be improved by making $Al(NO_3)_3$ rich.

When the impregnation solution of the above metal compound is prepared, a temperature is desirable to be 50–130° C. When it is lower than 50° C., the solubility of the medium is low, while when it exceeds 130° C., the reaction rapidly proceeds into gelation and the solution can not be used as an applying solution. The stirring time is desirable to be 1–9 hours. Because the viscosity of the solution is stable within the above range.

In ord r to produce a composite oxid or solid solution of zirconium with the cerium containing metal compound ($Al(NO_3)_3$ and $Ce(NO_3)_3$) in addition to the above embodiment, it is favorable that $ZrO(NO_3)_2$ or $ZrO_2$ is used as a zirconium source and dissolved in water or ethylene glycol to form a mixed solution and the above compound is impregnated with the mixed solution and dried and fired to obtain the composite oxide.

In the invention, it is important that the above prepared solution of the metal compound is invaded into all pores as a gap between the ceramic particles in the cell wall. For this end, it is favorable to adopt, for example, a method wherein a catalyst support (filter) is placed in a vessel and the metal compound solution is filled to conduct deaeration, a method wherein the solution is flowed from one side of the filter and deaeration is carried out from the other side thereof, and so on. In this case, an aspirator, a vacuum pump or the like may be used as a deaeration apparatus. By using such an apparatus, air in the pores of the cell wall can be removed and hence the solution of the metal compound can uniformly be applied onto each surface of the ceramic particles.

c. Drying Step

This step is a treatment that volatile components such as NO$_2$ and the like are evaporated off to fix a gel of the solution to the surface of the ceramic particle and an extra solution is removed, which is carried out by heating at 120–170° C. for about 2 hours. When the heating temperature is lower than 120° C., it is difficult to evaporate the volatile components, while when it exceeds 170° C., the gelated film thickness becomes ununiform.

d. Preliminary Firing Step

This step is a preliminary firing treatment for removing residual components to from amorphous alumina, which is desirable to heat to a temperature of 300–500° C. When the temperature of the preliminary firing is lower than 300° C., it is difficult to remove residual organic matter, while when it exceeds 500° C., Al$_2$O$_3$ is crystallized and boehmit of small fibrous protrusion can not be formed by the subs quent hot water treatment.

e. Hot Water Treating Step

This step is a treatment for forming a given structure of alumina thin film. In this treatment, immediately after the preliminarily fired catalyst support is immersed into water, particles on the surface of amorphous alumina thin film are subjected to a deflocculating action to discharge into the solution at a sol state, and also boehmite particles produced by hydration coagulate into small fibrous protrusions to form a stable state against deflocculation.

That is, alumina thin film indicating a thin film state of individually adhering to each surface of the ceramic particles by the hot water treatment is forested into small fibers (needle particles) to form a thin film of a rough surface indicating a so-called haired structure. Therefore, it is a thin film having a higher specific surface area. In general, the sintering of alumina proceeds as the surface diffusion is main, and the specific surface area rapidly decreases in the phase transformation into α-alumina. However, when silica is caught by the alumina particles, it is considered that this silica clogs the pore site of alumina or moves onto the needle-shaped particle in the course of the heat treatment to suppress the surface diffusion or the sintering between the particles. Therefore, a viscous flowing mechanism from a contact point between the needle-shaped particles through the sintering is predominant in an initial sintering of the support, while it is considered that at the last stage, silica shields a mass transferring path between the needle-shaped particles; and hence the transformation into α-alumina is obstructed and the sintering does not proceed and the high specific surface area is maintained.

A temperature in the hot water treatment is desirable to be 50–100° C. Wh n it is lower than 50° C., hydration of amorphous alumina thin film does not proce d and boehmite of small fibrous protrusion is not formed. While, when it exceeds 100° C., water is evaporated and the step is hardly maintained over a long time. The treating time is desirable to be not less than 1 hour. When it is less than 1 hour, hydration of amorphous alumina is insufficient.

d. Firing Step

This step is a treatment wherein boehmite produced by hydration is rendered into alumina crystal. A preferable firing temperature is 500–1000° C., and the treatment is carried out for 5–20 hours. When the temperature is lower than 500° C., the crystallization does not proceed, while when it exceeds 1000° C., the sintering excessively proceeds and the surface area tends to lower.

(2) Holding of Active Component a. Solution Preparing Step

Onto the surface of SiC ceramic support (filter) is covered an alumina thin film having a haired structure as shown in FIG. 3(c) and an active component such as Pt or the like is held on irregular surface of the alumina thin film. In this case, a holding amount of the active component is determined by dropwisely impregnating an aqueous solution containing Pt or the like in an amount corresponding to a water absorbing amount of the support so as to render into a state of slightly wetting the surface.

For example, the water absorbing amount of SiC ceramic support absorbs 24.7 g/l when a measured value of the water absorbing amount of a dry support is 22.46 mass % and the support has a mass of 110 g and a volume of 0.163 l.

As a starting substance of Pt is used, for example, a solution of dinitroanmine platinum nitrate ([Pt(NH$_3$)$_2$(NO$_2$)$_2$] HNO$_3$, Pt concentration: 4.53 mass %). For instance, in order to hold a given amount of 1.7 g/l of Pt, the support is nough to hold Pt of 1.7 (g/l)*0.163 (1)=0.272 g, so that the solution of dinitroanmine platinum nitrate (Pt concentration: 4.53%) is diluted with a distilled water. That is, a ratio by weight X (%) of solution of dinitroanmine platinum nitrate (Pt concentration: 4.53 mass %)/distilled water is 24.8 mass % as calculated by X=0.272 (Pt amount g)/24.7 (water content g)/4,53 (Pt concentration mass %).

b. Solution Impregnation Step

The thus prepared aqueous solution of the given amount of dinitroanmine platinum nitrate is added dropwise on both end faces of the support through a pipette at constant intervals. For example, Pt is uniformly dispersed and fixed onto the surface of the alumina holding film covering the SiC support by dropwisely adding 40–80 droplets on a one-side surface at given intervals.

c. Drying, Firing Steps

The support after the addition of the aqueous solution is dried at 110° C. for about 2 hours to remove water and placed in a desicator and left to stand for 1 hour and an adhesion amount is measured by using an electron balance or the like. Then, the firing is carried out in N2 atmosphere under conditions of about 500° C. and 1 hour to metallize Pt.

The catalyst according to the invention is used in applications as a filter for purifying the exhaust gas. One of the applications is an oxidation catalyst for gasoline engine, three-way catalyst or an oxidation catalyst for diesel engine as an example of a plain honeycomb support, and the other application is a diesel particulate filter wherein openings of a honeycomb are alternately clogged in a checkered pattern.

The diesel particulate filter (hereinafter abbreviated as "DPF" simply) itself has only a function of catching particulates (floating particulate mass: PM) through filtering wall (cell wall 102), but when the active catalyst component is held thereon, hydrocarbon and carb n monooxide in the exhaust gas can be oxidized.

And also, if NOx selective reducing type catalyst component or absorbing typ catalyst component capable f reducing NOx is held even in an oxidizing atmosphere such as a diesel exhaust gas, the reduction of NOx is possible. Moreover, the PM caught in the DPF brings about the increase of pressure loss in the DPF accompanied with the deposition, so that it is usually required to regenerate by combustion or the like. A temperature of starting combustion of soot (carbon) as a main component of PM included in the diesel exhaust gas is usually about 550–630° C. In this point, when the active catalyst component is held on the DPF, a combustion reaction path of the soot changes and an energy partition can be decreased and hence the combustion temperature can largely be lowered to 300–400° C. and also energy required for regeneration can be reduced to constitute a DPF system having a higher efficiency.

EXAMPLES

Example 1

This example is conducted for confirming action and effect of the alumina thin film formed on the surface of the support.

A catalyst support produced under conditions shown in Table 1 (Invention Examples 1-1, 1-2, Comparative Example 1) is attached to a particulate filter (DPF) in an exhaust gas purifying apparatus for diesel vehicle to conduct a purification test. According to this test, the pressure loss property, heat resistance and wash resistance of the filter are measured. The measured results are shown in the same table and in FIGS. 10, 11 and 12.

TABLE 1

Figure 10:
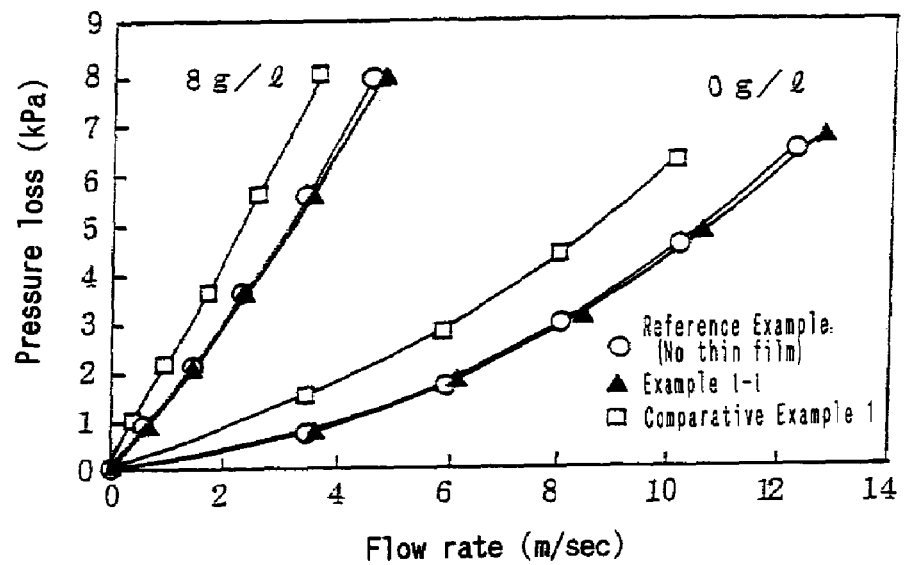
FIG. 10 is a comparative graph showing a pressure loss characteristic in Example 1.
Figure 11:
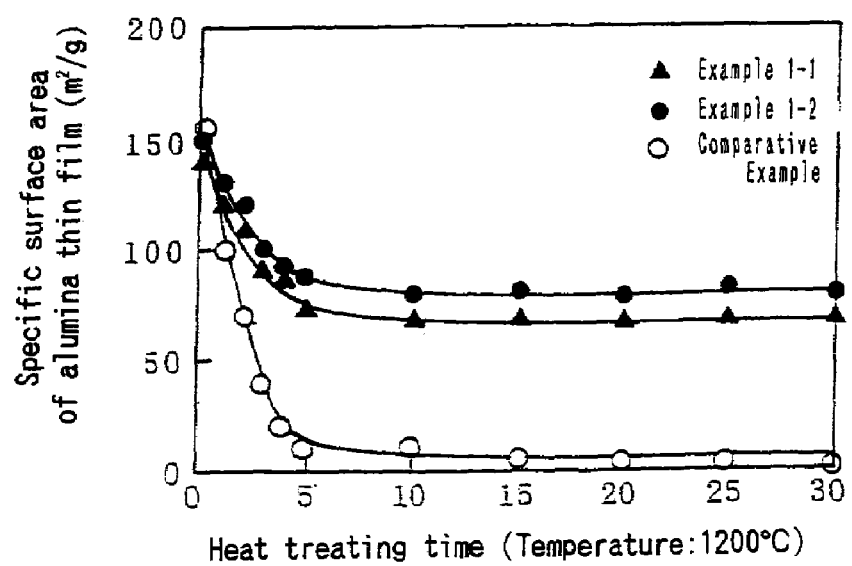
FIG. 11 is a comparative graph showing a specific surface area in Example 1.
Figure 12:
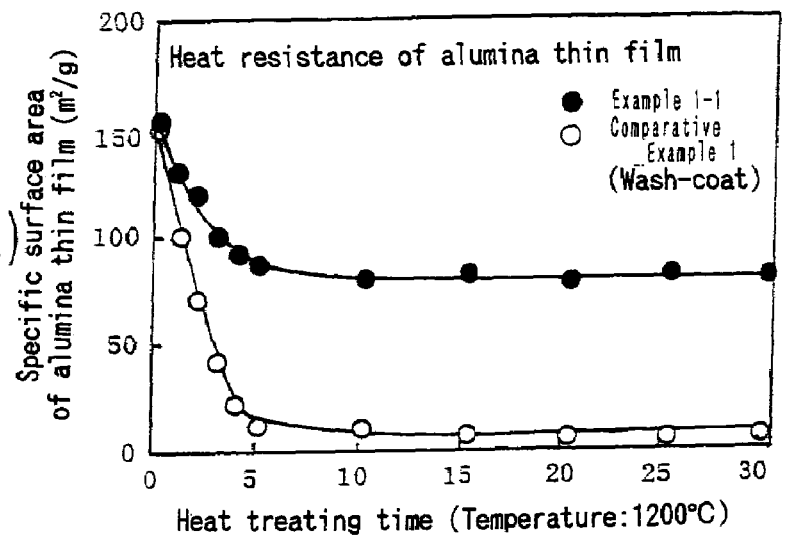
FIG. 12 is a comparative graph showing a comparative graph showing a heat resistance in Example 1.
Figure 12:
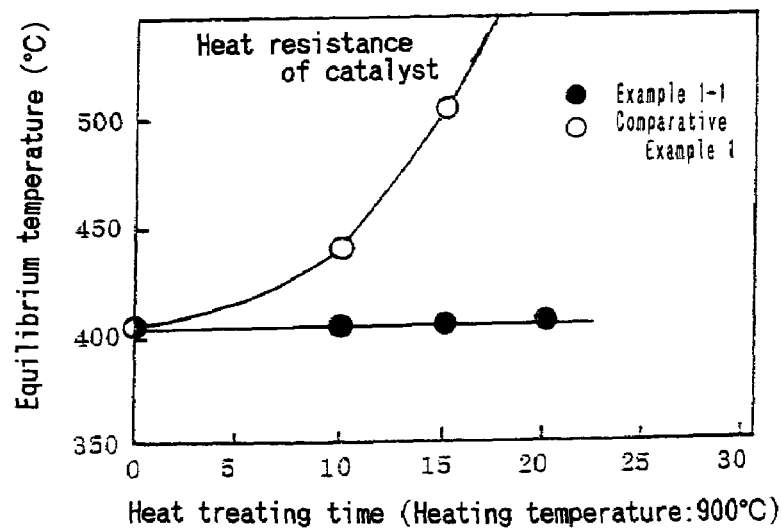

|  | Example 1-1 | Example 1-2 | Comparative Example 1 |
|---|---|---|---|
| Honeycomb support | SiC filter | SiC filter | SiC filter |
| Alumina coat | impregnation | impregnation | wash-coat |
| Pretreatment of filter | none | 1100° C., 20 hr | none |
| SiO$_2$ amount (Si amount) | 0.2% (0.11%) | 3% (1.0%) | 0.2% (0.11%) |
| Al$_2$O$_3$ amount | 3.2% | 3.0% | 3.1% |
| Alumina thin film |  |  |  |
| diameter | 10 nm | 6 nm | — |
| length | 150 nm | 120 nm | — |
| full length/diameter | 15 | 20 | — |
| Pressure loss property |  | FIG. 10 |  |
| Specific surface area |  | FIG. 11 |  |
| Heat resistance |  | FIG. 12 |  |
| Wash resistance | no peel at 70 kg/cm$^2$ | no peel at 80 kg/cm$^2$ | almost peel at 10 kg/cm$^2$ | a. As shown in FIG. 10, it has been understood that before the particulate (floating particulate mass: PM) is stored, the invention example 1-1 indicates the pressure loss property approximately equal to that of a case having no alumina thin film (reference example) before the particulate (floating particulate mass: PM) is stored, and the pressure loss even after the storing is considerably small as compared with Comparative Example 1 when the same amount of the gas is passed.

b. As shown in FIG. 11, it has been understood that the lowering of the specific surface area of the alumina when being subjected to a heat treatment at the same temperature is small in the invention examples 1-1, 1-2 as compared with the comparative example.

c. As shown in FIG. 12, the heat resistances of the alumina thin film and the catalyst itself are good in the invention examples.

d. As to the wash resistance, as shown in Tabl 1, it has been found that the invention examples are considerably superior to the comparative example.

Example 2

This example shows results tested on various properties of diesel particulate filter (DPF) when platinum (Pt) as an active component is held on a ceramic support. The conditions and the properties are shown in Table 2 and FIG. 13.

Moreover, an example is a case that alumina holding film (8 g/l) is formed on the particle surface of the support, and a reference example is a case that a holding film is not held on the surface of the support, and a comparative example is a case that a wash-coat alumina uniform film is formed on the surface of the support.

TABLE 2

Figure 14:
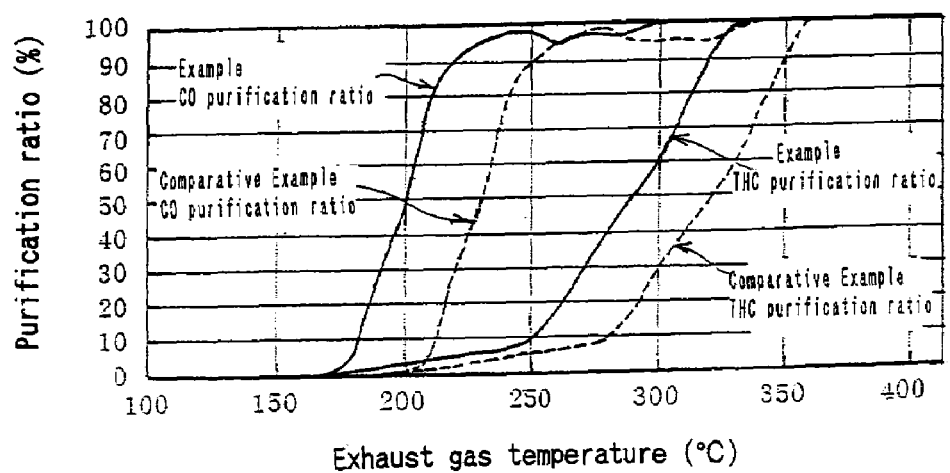
FIG. 14 is a comparative graph of THC, CO purification property in Example 2.

|  | Example 2 | Reference Example | Comparative Example 2 |
|---|---|---|---|
| Support | SiC-DPF | SiC-DPF | SiC-DPF |
| Al$_2$O$_3$ coat | impregnation | none | wash coat |
| Al$_2$O$_3$ amount | 8 g/l | none | 8 g/l |
| Pt amount | 1.7 g/l | none | 1.7 g/l |
| Pressure loss property |  |  |  |
| PM 0 g/l (10 m/sec) | 1 | 1 | 1.45 |
| PM 8 g/l (3 m/sec) | 1 | 1 | 1.45 |
| Heat resistance of Al$_2$O$_3$ | FIG. 12 |  |  |
| Initial property in soot combustion |  |  |  |
| equilibrium temperature | 420° C. | >480° C. | 440° C. |
| equilibrium pressure | 9.2 kPa | — | 11 kPa |
| Property in soot combustion after aging |  |  |  |
| equilibrium temperature | 420° C. | — | >480° C. |
| equilibrium pressure | 9.2 kPa | — | — |
| Conversion ratio of THC, CO |  | FIG. 14 |  |

The pressure loss property, heat resistance, property in soot combustion and purification rati and regeneration ratio of THC, CO shown in the above Table 2 are explained below.

Figure 13:
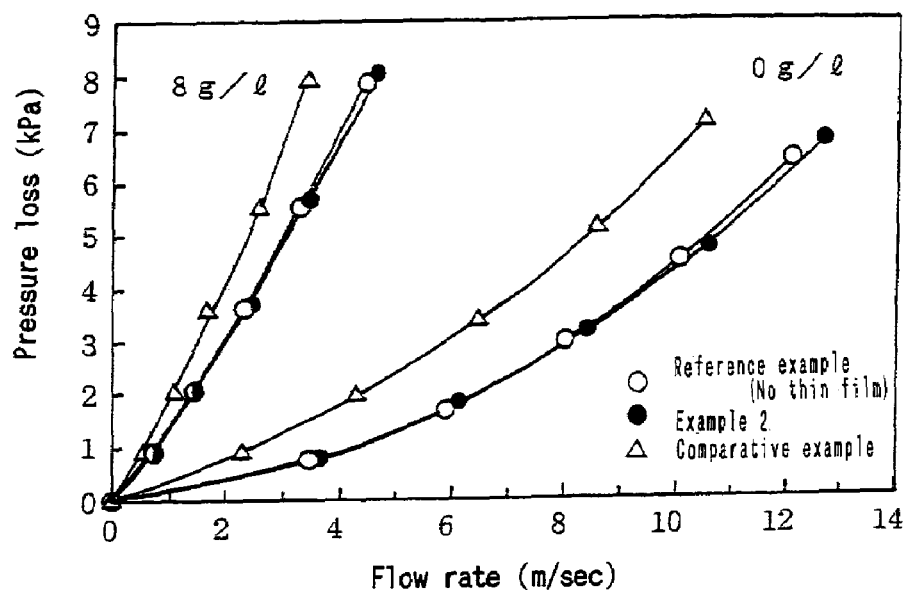
FIG. 13 is a comparative graph showing a pressure loss characteristic in Example 2.

① Pressure Loss Property;

As shown in FIG. 13, when the example is compared with the reference example and the comparative example, the example adaptable in the invention indicates the pressure loss property approximately equal to the reference example having no holding film and considerably develops the effect as compared with the comparative example.

② Heat Resistance;

As shown in FIGS. 12(*a*), (*b*), it has been understood that the effect of the example adaptable in the invention is remarkable when a change of specific surface area of the alumina thin film in the heating at 1200° C. is compared with a change of the equilibrium temperature in the heating at 900° C. with respect to the example and the comparative example.

② Property in Soot Combustion;

The performance combusting the soot of the catalyst is evaluated by an equilibrium temperature testing method. This testing method is the following test. That is, a diesel engine is placed in a testing apparatus and a catalyst (DPF) is inserted in a way of an exhaust pipe thereof and an operation is started at this state. Since soot is caught in DPF with the lapse of operating time, the pressure loss increases. In this case, as the exhaust temperature is raised by any method, a point counterbalancing a soot depositing rate with an oxidation reaction rate of soot (equilibrium temperature)

appears at a certain temperature, while a pressure at this time (equilibrium pressure) can be measured. It can be said that the lower both the equilibrium temperature and equilibrium pressure, the b tter the catalyst.

In this test, as the method of raising th exhaust gas t mperature, an electric heater is inserted between the diesel engine and DPF. In this method, engine revolution number and loading can be made constant, so that the composition of the diesel exhaust gas does not change in the test and the equilibrium temperature and the equilibrium pressure are precisely measured. The test condition conducts a steady run at a diesel engine displacement of 273 cc, a revolution number of 1250 RPM, a loading of 42 Nm, and a volume of the filter tested is □34×150 mmL and 0.16 liter.

Figure 15:
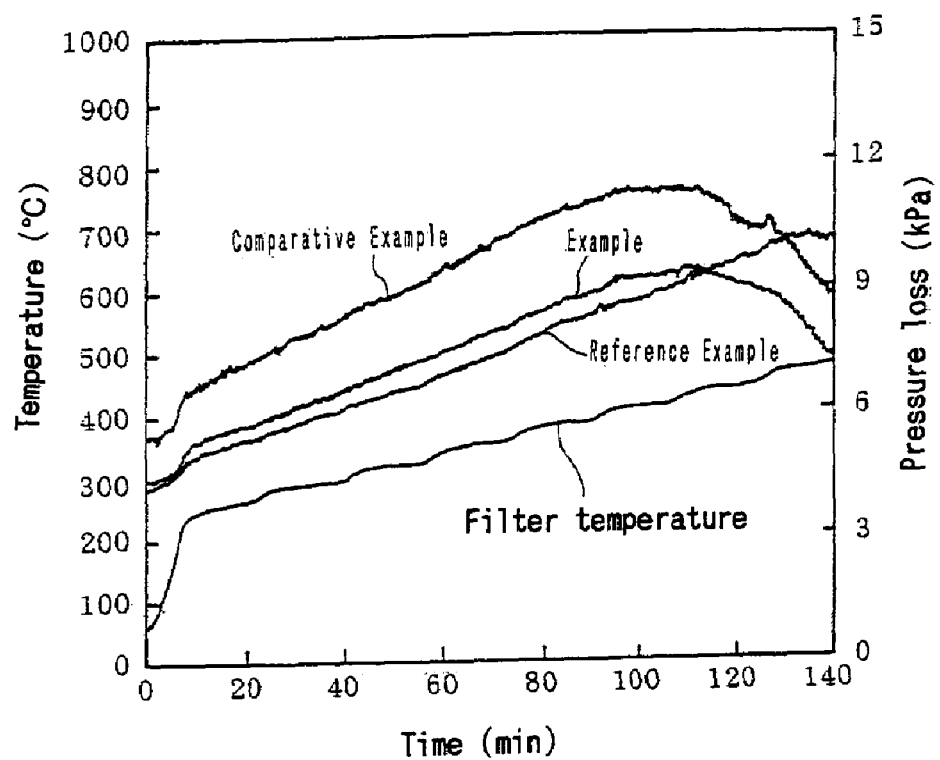
FIG. 15 is a comparative graph showing a burning characteristic of soot in Example 2.

The above test results are shown in Table 2 and FIG. 15. According to the test results, when the filter temperature rises with the rise of the exhaust gas temperature, in the invention example, the equilibrium point appears at about 620° C. On the other hand, the equilibrium temperature of the comparative example is about 780° C. The equilibrium pressure at this time is 9.5 kPa in the example, and 11.5 kPa in the comparative example, so that the improvement of about 20% is attained.

Furthermore, when the same test is carried out after the aging is conducted in an oxidizing atmosphere of 850° C.-20 hr, the equilibrium temperature and pressure are not substantially deteriorated in Example 2 according to the invention, while in Comparative example 2, they are deteriorated to the same state as in a case holding no catalyst.

④ Purification Ratio of THC, CO;

This property is a general method in case of evaluating an oxidation catalyst. A relation of a temperature to purification of so-called THC (total hydrocarbon) into CO2 and water and purification of CO into CO2 is examined. This property is said to be an excellent catalyst as the conversion ratio becomes higher from a low temperature.

As a measuring method is used an engine and a filter, wherein amounts of THC and CO before and after the filter are measured by an exhaust gas analyzer to determine the purification ratio to the temperature.

As shown in FIG. 14, the invention example shows an excellent performance as compared with the comparative example because the purification temperature of THC and CO is lowered by about 30° C. This is considered due to the fact that since the catalyst is uniformly dispersed into the particles of the catalyst in the invention example, a time passing through the wall is apparently long as compared with a time passing through the wash coat and hence a chance of adsorbing CO, THC on an active point of Pt is increased.

Example 3

This example is carried out for confirming action and effect of ceria—containing alumina thin film formed on the surface of the support.

A catalyst support produced under conditions shown in Table 3 (invention examples 3-1, 3-2, comparative example 3) is attached to a particulate filter (DPF) in an exhaust gas purifying apparatus of a diesel vehicle to conduct a purification test. By this test are examined the pressure loss property, heat resistance and wash resistance of this filter.

TABLE 3

Figure 16:
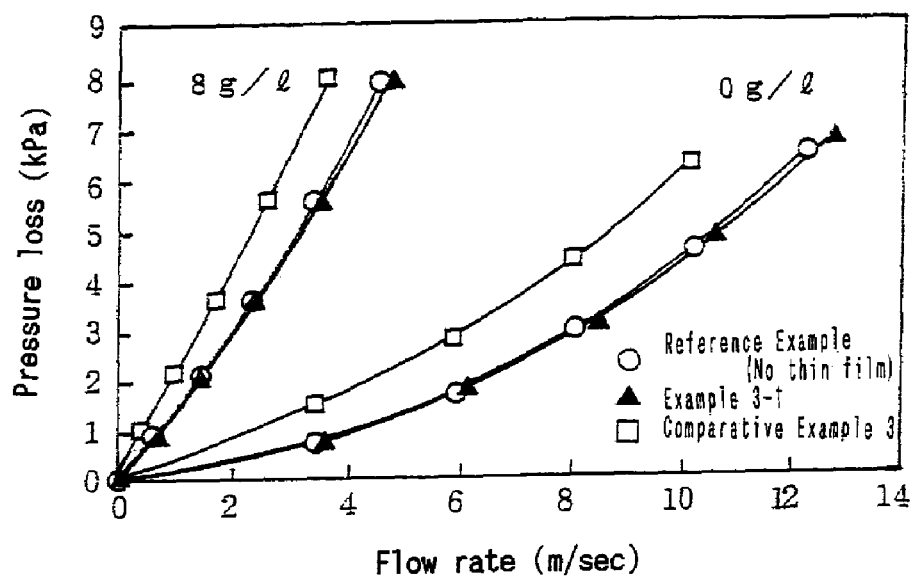
FIG. 16 is a comparative graph of a pressure loss characteristic in Example 3.
Figure 17:
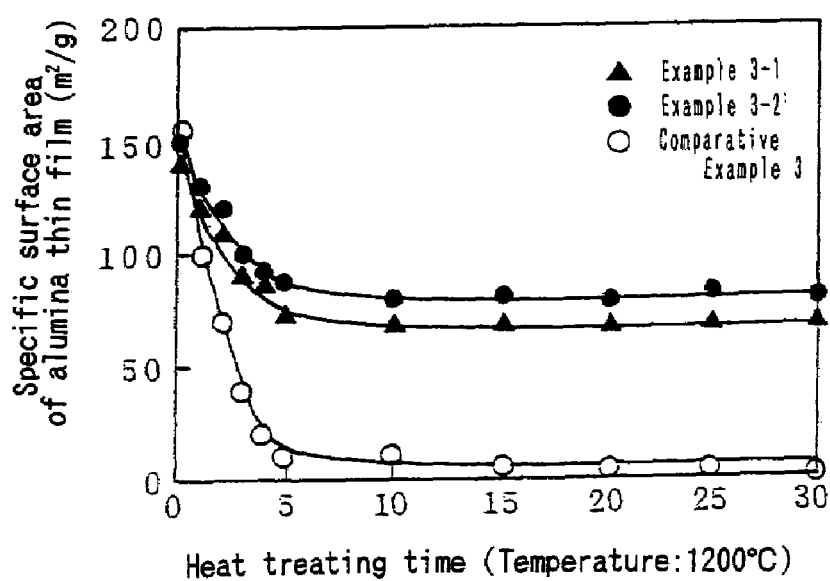
FIG. 17 is a comparative graph of a specific surface area in Example 3.
Figure 18:
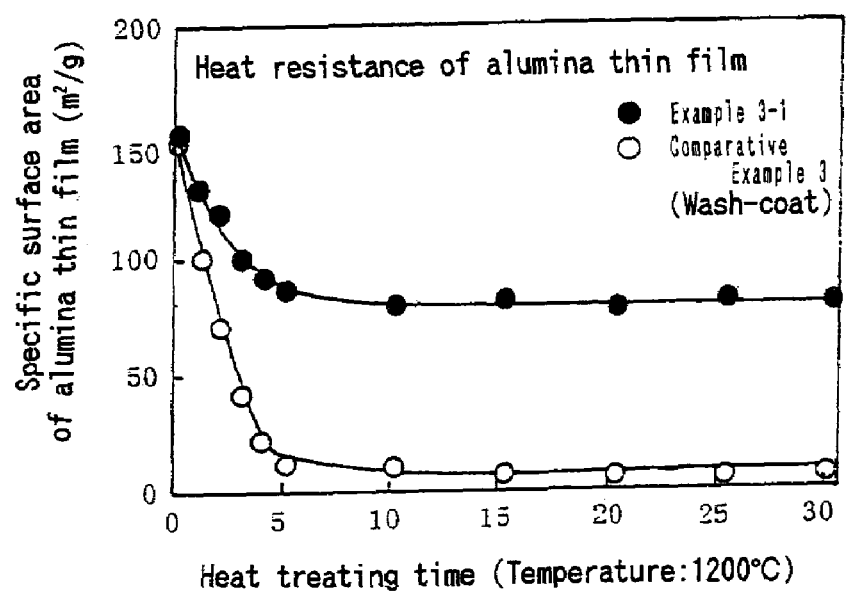
FIG. 18 is a comparative graph of heat resistance of (a) alumina thin film and (b) catalyst in Example 3.
Figure 18:
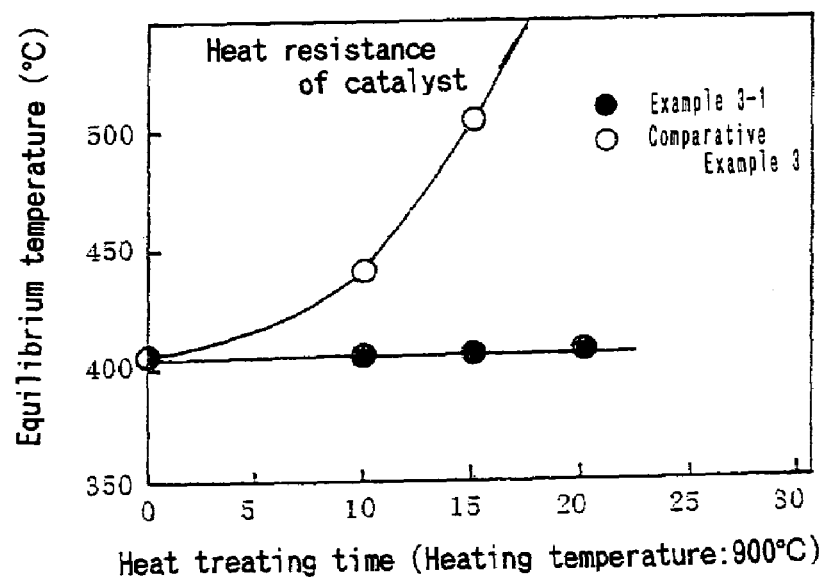

|  | Example 3-1 | Example 3-2 | Comparative Example 3 |
|---|---|---|---|
| Honeycomb support | SiC filter | SiC filter | SiC filter |
| Alumina holding coat | impregnation | impregnation | wash coat |
| Preliminary treatment of filter | none | 1100° C., 20 hr | none |
| SiO$_2$ amount (Si amount) | 0.2% (0.11%) | 3%, (1.0%) | 0.2% (0.11%) |
| Al$_2$O$_3$ amount | 3.2% | 3.0% | 3.1% |
| Alumina thin film |  |  |  |
| diameter | 10 nm | 6 nm | — |
| length | 150 nm | 120 nm | — |
| full length/diameter | 15 | 20 | — |
| CeO$_2$ (wt %) | 30% | 30% | — |
| Pressure loss property |  | FIG. 16 |  |
| Specific surface area |  | FIG. 17 |  |
| Heat resistance |  | FIG. 18 |  |
| Wash resistance | no peel at 70 kg/cm$^2$ | no peel at 80 kg/cm$^2$ | almost peel at 10 kg/cm$^2$ | a. As shown in FIG. 16, it has been understood that the invention example 3-1 shows the pressure loss property approximately equal to a reference example having no alumina thin film before the storing of particulate (floating particulate mass: PM), and the pressure loss when passing the same gas is considerably small as compared with Comparative Example 3 after the storing.

b. As shown in FIG. 18(*a*), it has been understood that the invention example 3-1 is small in the lowering of alumina specific surface area when being subjected to the heat treatment at the same temperature and excellent in the heat resistance as compared with Comparative Example 3 of wash-coat.

c. As to the wash resistance, as shown in Table 3, the invention examples 3-1, 3-2 are superior to Comparative Example 3.

d. FIG. 9 shows a regeneration ratio (C content removed from a regenerating filter/C content adhered to a filter before regeneration), from which it is clear that carb n of 45% is removed in the alumina thin film containing c ria, while carbon removal is only 20% in the wash-coat alumina uniform film.

Moreover, DPF filters soot in the exhaust gas, so that the soot is deposited thereon. An action of removing the deposited soot is called as a regeneration. To this end, a ratio of regenerated soot weight to deposited soot weight by percentage is a regeneration ration.

Example 4

This example shows results tested on various properties of a diesel particulate filter (DPF) when platinum (Pt) as an active component is held on a ceramic support. The test conditions and properties are shown in Table 4.

Moreover, examples 4-1, 4-2 are particle surface of the support having an alumina holding film (8 g/l), and a reference example is a support surface having no holding film, and Comparative Example 4 is a wash-coat alumina uniform film formed on the surface of the support. As shown in Table 4, it has been confirmed that the examples according to the invention are superior in the pressure loss property, heat resistance, property in soot combustion and conversion ratio of THC and CO.

TABLE 4

| | Example 4-1 | Example 4-2 | Reference Example | Comparative Example 4 |
|---|---|---|---|---|
| Support | SiC-DPF | SiC-DPF | SiC-DPF | SiC-DPF |
| $Al_2O_3$ coat | impregnation | impregnation | none | wash-coat |
| $Al_2O_3$ amount | 8 g/l | 8 g/l | none | 8 g/l |
| $CeO_2$ amount | 2 g/l | 1 g/l ($CeO_2$) 1 g/l ($ZrO_2$) | none | none |
| Pt amount | 1.7 g/l | 1.7 g/l | none | 1.7 g/l |
| Pressure loss property | | | | |
| PM 0 g/l (10 m/sec) | 1 | 1 | 1 | 1.45 |
| PM 8 g/l (3 m/sec) | 1 | 1 | 1 | 1.45 |
| Heat resistance of $Al_2O_3$ coat | | | FIG. 17 | |
| Initial property in soot combustion | | | | |
| Equilibrium temperature | 620° C. | 620° C. | >680° C. | 780° C. |
| Equilibrium pressure | 9.5 kPa | 9.2 kPa | — | 11.5 kPa |
| Property in soot combustion after aging | | | | |
| Equilibrium temperature | 620° C. | 620° C. | — | >780° C. |
| Equilibrium pressure | 9.2 kPa | 9.2 kPa | — | — |
| Conversion ratio of THC, CO | | | FIG. 14 | |

INDUSTRIAL APPLICABILITY

As mentioned above, according to the invention, there can be realized the provision of a catalyst for the purification of an exhaust gas being large in the effect of catching diesel particulates and small in the pressure loss and having excellent heat resistance and soot combustion property and good wash resistance and the establishment of an advantageous production technique thereof.

Moreover, the catalyst according to the invention is particularly said to be preferable for applying to a system of treating a diesel exhaust gas, but is possible to use in the following fields.

A. Function as an Oxidation Catalyst for Diesel Exhaust Gas
 ① Exhaust gas purifying function . . . oxidation of THC, CO
 ② Function not obstructing engine operation . . . pressure loss B. Function as a Diesel Particulate Filter Provided with a Catalyst
 ① Exhaust gas purifying function . . . combustion temperature of soot, oxidation of THC, CO
 ② Function not obstructing engine operation . . . pressure loss

The invention claimed is:

1. A catalyst comprising a silicon-containing ceramic support and an active catalyst distributed on a surface thereof, wherein the support comprises particles and each of these particles has a silicon oxide layer on its surface, and said silicon oxide layer is covered by a film of a rare earth oxide-containing alumina.

2. The catalyst of claim 1, wherein the support comprises the silicon oxide layer in a concentration of from 0.001 to 20 mass-%.

3. The catalyst of claim 1, wherein the support comprises a non-oxide ceramic.

4. The catalyst of claim 3, wherein the non-oxide ceramic comprises at least one of silicon carbide and silicon nitride.

5. The catalyst of claim 1, wherein the support comprises at least one of a porous body, fiber-shaped body and pellet-shaped body.

6. The catalyst of claim 1, wherein the support comprises a honeycomb-shaped porous silicon carbide sintered body.

7. The catalyst of claim 1, wherein the support comprises the rare earth oxide-containing alumina film in a concentration of from 0.1 to 15 mass-%.

8. The catalyst of claim 1, wherein the alumina comprises the rare earth oxide in a concentration of from 10 to 80 mass-%.

9. A catalyst comprising a silicon-containing ceramic support and an active catalyst distributed on a surface thereof, wherein the support comprises particles and each of these particles has a silicon oxide layer on its surface, and said silicon oxide layer is covered by a film of a rare earth oxide-containing alumina, wherein the support comprises an oxide ceramic.

10. The catalyst of claim 9, wherein the oxide ceramic comprises at least one of sialon, mullite and cordierite.

11. A catalyst comprising a silicon-containing ceramic support and an active catalyst distributed on a surface thereof, wherein the support comprises particles and each of these particles has a silicon oxide layer on its surface, and said silicon oxide layer is covered by a film of a rare earth oxide-containing alumina, wherein at least a part of the rare earth oxide comprises a composite oxide with zirconium.

12. The catalyst of claim 11, wherein the composite oxide has a particle size of from 1 to 30 nm.

13. A catalyst comprising a silicon-containing ceramic support and an active catalyst distributed on a surface thereof, wherein the support comprises particles and each of these particles has a silicon oxide layer on its surface, and said silicon oxide layer is covered by a film of a rare earth oxide-containing alumina, said film having on its surface rare earth oxide-containing alumina fibers which protrude therefrom in a needle-like form to result in an irregular surface, which irregular surface holds the active catalyst.

14. The catalyst of claim 13, wherein the support comprises the silicon oxide layer in a concentration of from 0.001 to 20 mass-%.

15. The catalyst of claim 13, wherein the support comprises a non-oxide ceramic.

16. The catalyst of claim 15, wherein the non-oxide ceramic comprises at least one of silicon carbide and silicon nitride.

17. The catalyst of claim 13, wherein the support comprises an oxide ceramic.

18. The catalyst of claim 17, wherein the oxide ceramic comprises at least one of sialon, mullite and cordierite.

19. The catalyst of claim 13, wherein the support comprises at least one of a porous body, fiber-shaped body and pellet-shaped body.

20. The catalyst of claim 13, wherein the support comprises a honeycomb-shaped porous silicon carbide sintered body.

21. The catalyst of claim 13, wherein the support comprises the rare earth oxide-containing alumina film in a concentration of from 0.1 to 15 mass-%.

22. The catalyst of claim 21, wherein the alumina comprises the rare earth oxide in a concentration of from 10 to 80 mass-%.

23. The catalyst of claim 22, wherein at least a part of the rare earth oxide comprises a composite oxide with zirconium.

24. The catalyst of claim 23, wherein the composite oxide has a particle size of from 1 to 30 nm.

25. The catalyst of claim 13, wherein the fibers have a diameter of from 2 to 50 nm, a length of from 20-300 nm and a ratio total length/diameter of from 5 to 100.

26. The catalyst of claim 25, wherein the fibers have a specific surface area of from 50 to 300 $m^2/g$.

* * * * *